United States Patent
Cardwell et al.

(10) Patent No.: US 8,336,722 B2
(45) Date of Patent: *Dec. 25, 2012

(54) PALLET RACK AND METHOD FOR USE OF SAME

(76) Inventors: Steven A. Cardwell, Sunnyvale, TX (US); James C. Rutledge, Flower Mound, TX (US)

( * ) Notice: Subject to any disclaimer, the term of this patent is extended or adjusted under 35 U.S.C. 154(b) by 520 days.

This patent is subject to a terminal disclaimer.

(21) Appl. No.: 12/702,571

(22) Filed: Feb. 9, 2010

(65) Prior Publication Data

US 2010/0320163 A1 Dec. 23, 2010

Related U.S. Application Data

(60) Provisional application No. 61/218,344, filed on Jun. 18, 2009.

(51) Int. Cl.
*A47B 47/00* (2006.01)

(52) U.S. Cl. ....... 211/191; 211/59.4; 211/183; 137/312; 108/5; 108/20

(58) Field of Classification Search .................. 211/191, 211/175, 59.2, 59.4, 186, 187, 151, 153, 211/126.15; 220/571, 573; 222/108, 109; 137/312–314; 108/5, 20, 21, 102, 143, 92, 108/93; 410/26–28.1; 414/537, 542; 248/371, 248/393
See application file for complete search history.

(56) References Cited

U.S. PATENT DOCUMENTS

| | | | |
|---|---|---|---|
| 1,445,237 A | 2/1923 | Price | |
| 2,537,447 A | 1/1951 | Stefano | |
| 2,897,772 A | 8/1959 | Hunter | |
| 3,250,234 A * | 5/1966 | Holt | 108/5 |
| 3,339,994 A | 9/1967 | Reddig et al. | |
| 3,490,195 A | 1/1970 | Abramson | |
| 3,764,243 A | 10/1973 | Gambill et al. | |
| 5,079,044 A | 1/1992 | Schumacher et al. | |
| 5,156,367 A | 10/1992 | Wolfe | |
| 5,224,508 A | 7/1993 | Bates | |
| 5,295,591 A * | 3/1994 | Slater | 211/59.2 |
| 5,338,017 A | 8/1994 | Stemmle | |
| 5,452,739 A | 9/1995 | Mustee et al. | |
| 5,645,103 A | 7/1997 | Whittaker | |
| 5,775,858 A * | 7/1998 | Bacon | 410/26 |
| 6,287,061 B1 * | 9/2001 | Tinnell | 410/26 |
| 6,408,581 B2 | 6/2002 | Monachino | |
| 6,565,169 B1 | 5/2003 | Moreno-Olguin et al. | |
| 6,718,993 B1 | 4/2004 | DeMartini | |
| 7,008,719 B2 * | 3/2006 | Zaffino | 429/49 |
| 7,124,771 B2 * | 10/2006 | Frazier | 137/312 |
| 2004/0065355 A1 | 4/2004 | DeMartini | |

* cited by examiner

*Primary Examiner* — Korie H. Chan
(74) *Attorney, Agent, or Firm* — Scott T. Griggs; Griggs Bergen LLP

(57) ABSTRACT

A pallet rack and method for use of same are disclosed. Three panel frames interconnected by two parallel cross members define two lower pallet receiving areas and two upper pallet receiving areas. A catch tray is disposed beneath the two upper pallet receiving areas to catch and redirect fluid and debris to prevent cross-contamination between pallets. The catch tray includes a primary tray and a slidable dependent tray extendably coupled to the primary tray. The slidable dependent tray extends from a retracted position within the primary tray to an extended position having a general decline from the first panel frame to the second panel frame to furnish a slanted surface therebetween. Retraction of the dependent tray provides clearance for fork lift tines to access the rear upper pallet receiving area.

12 Claims, 9 Drawing Sheets

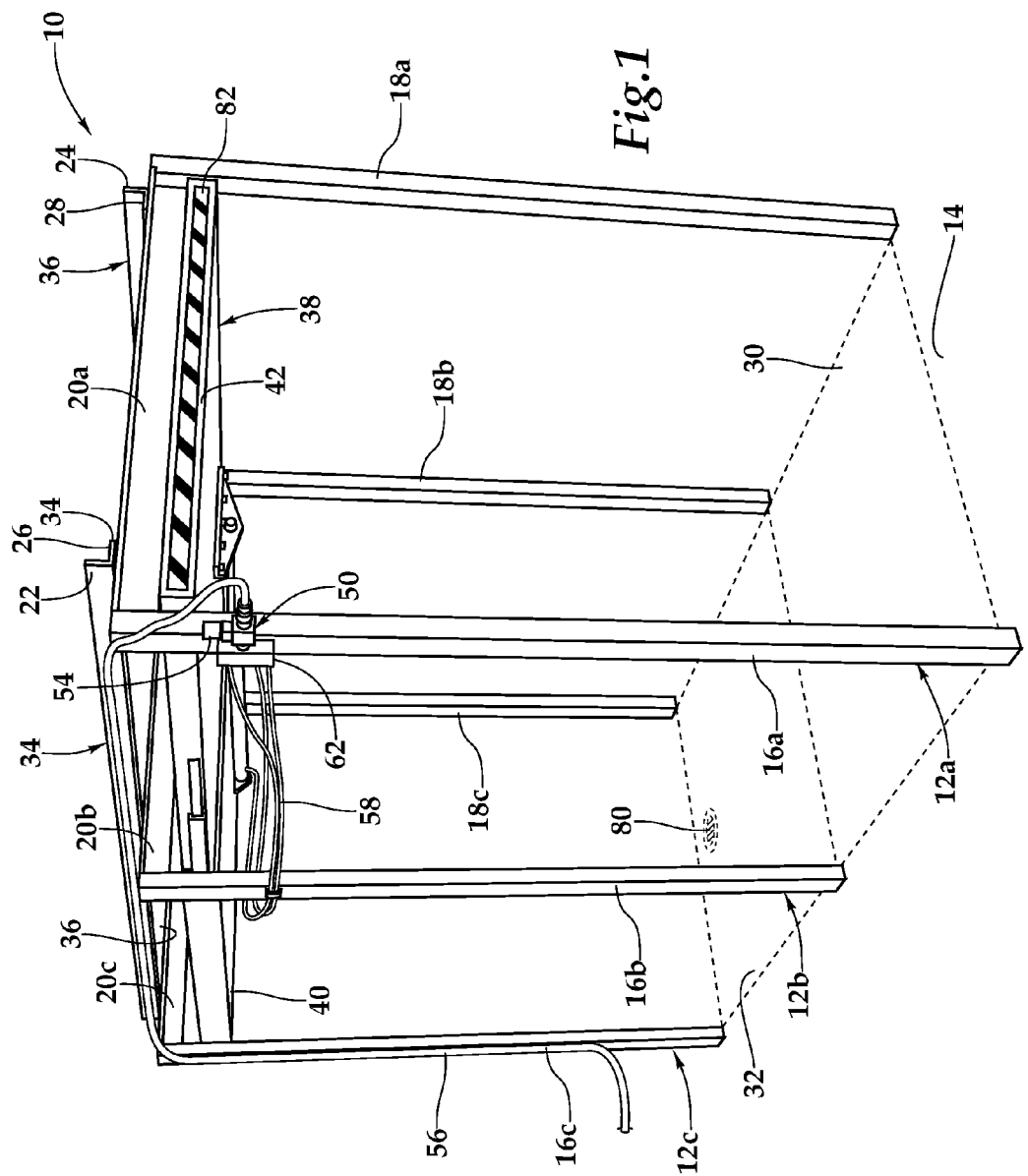

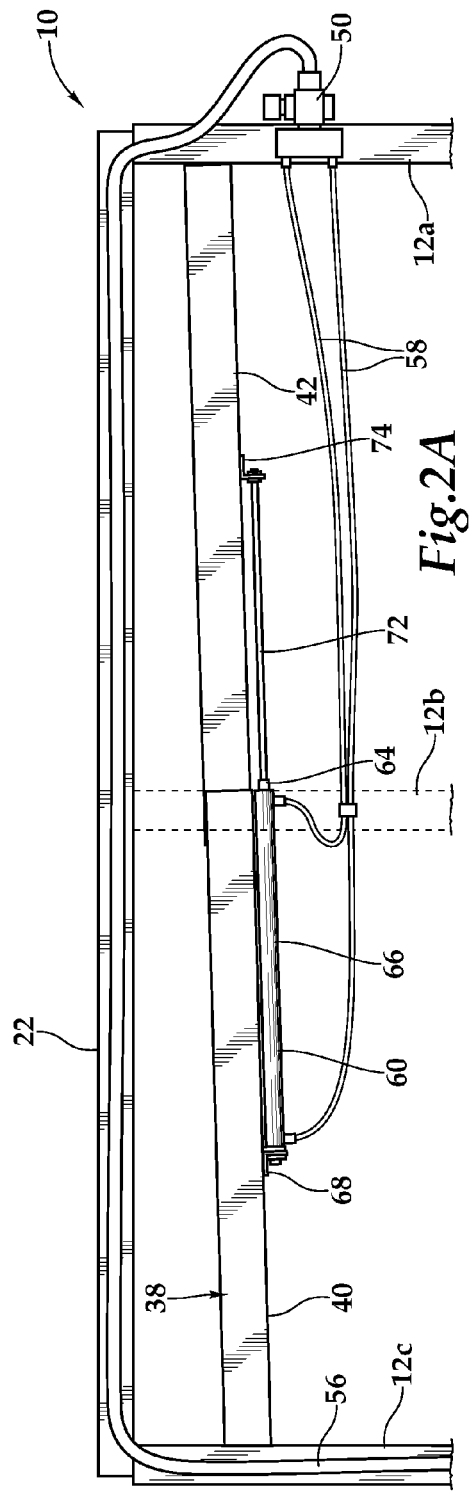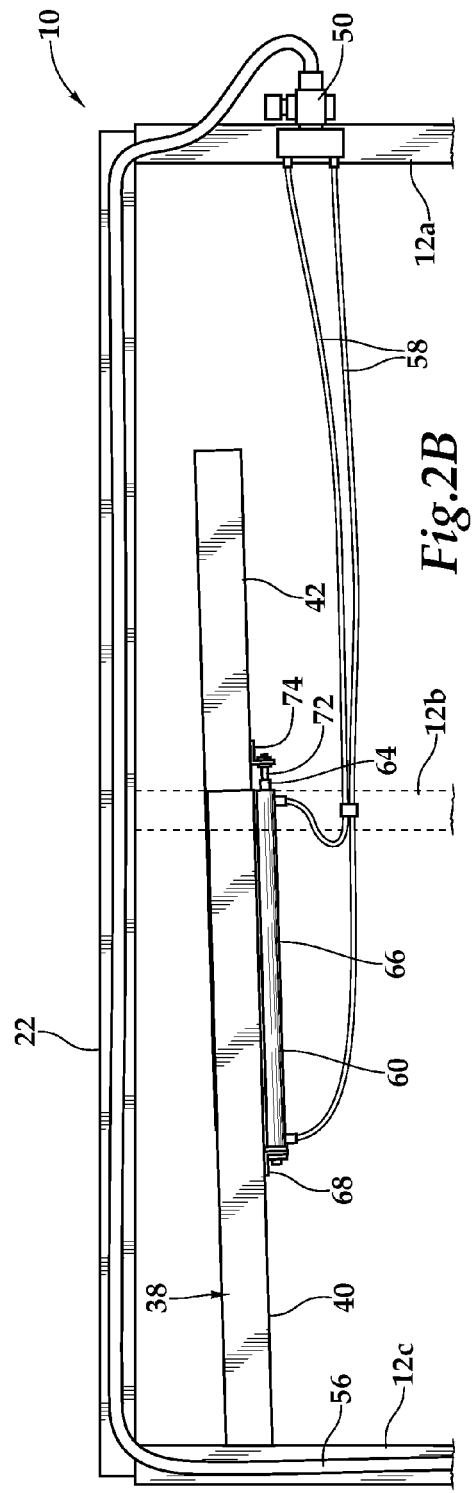

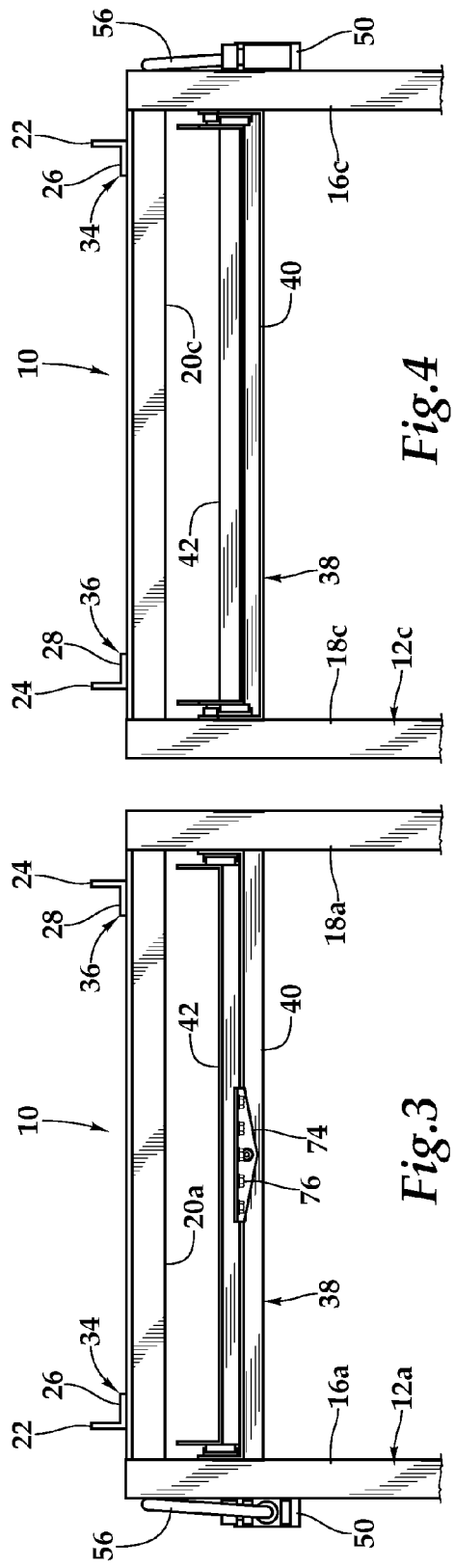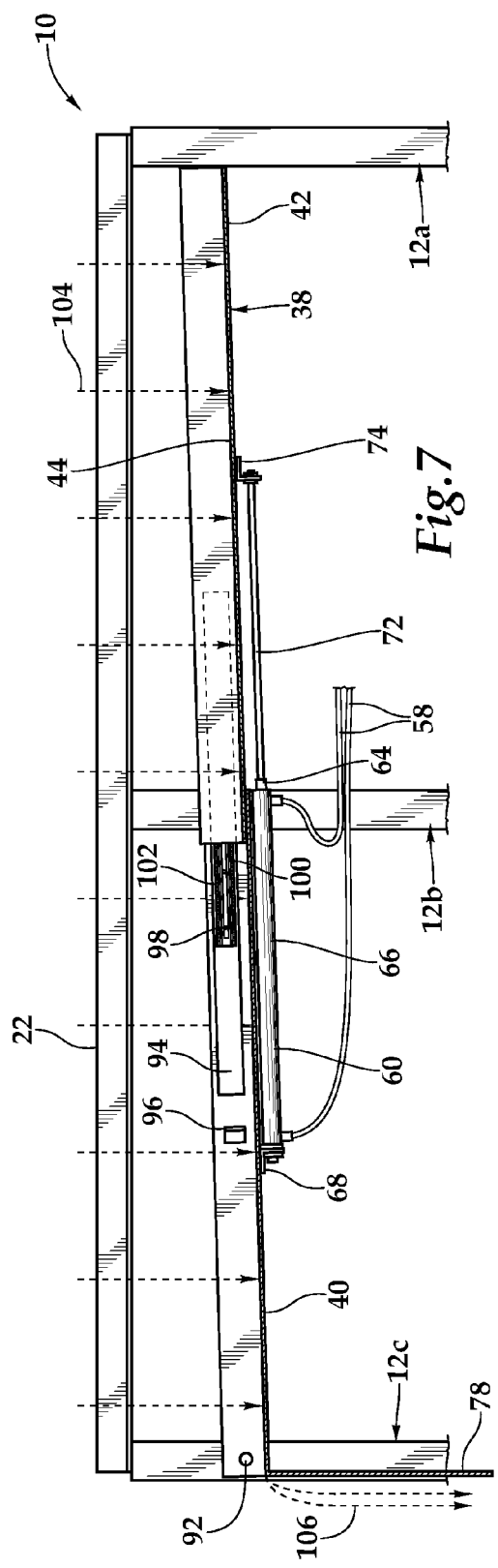

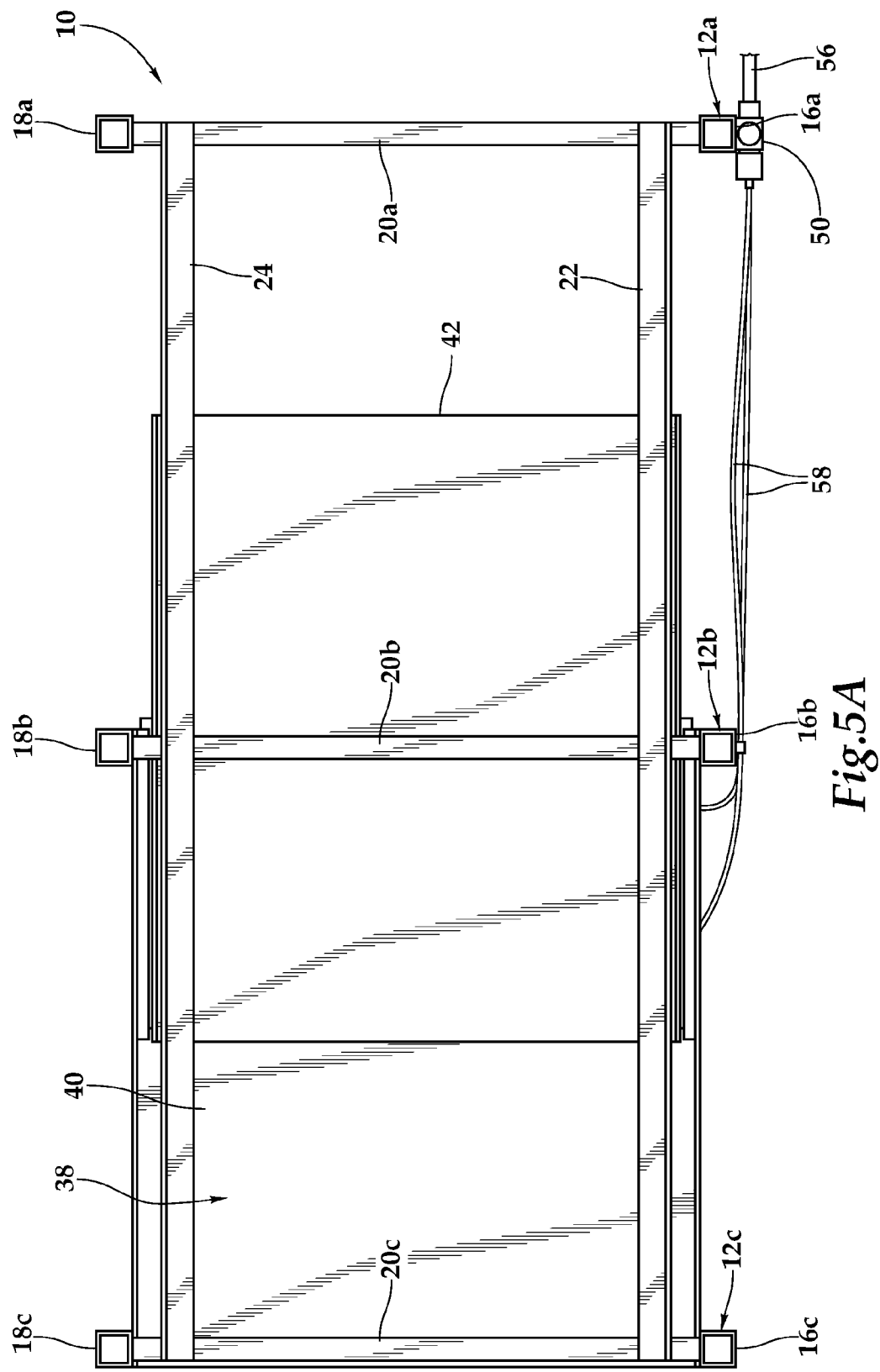

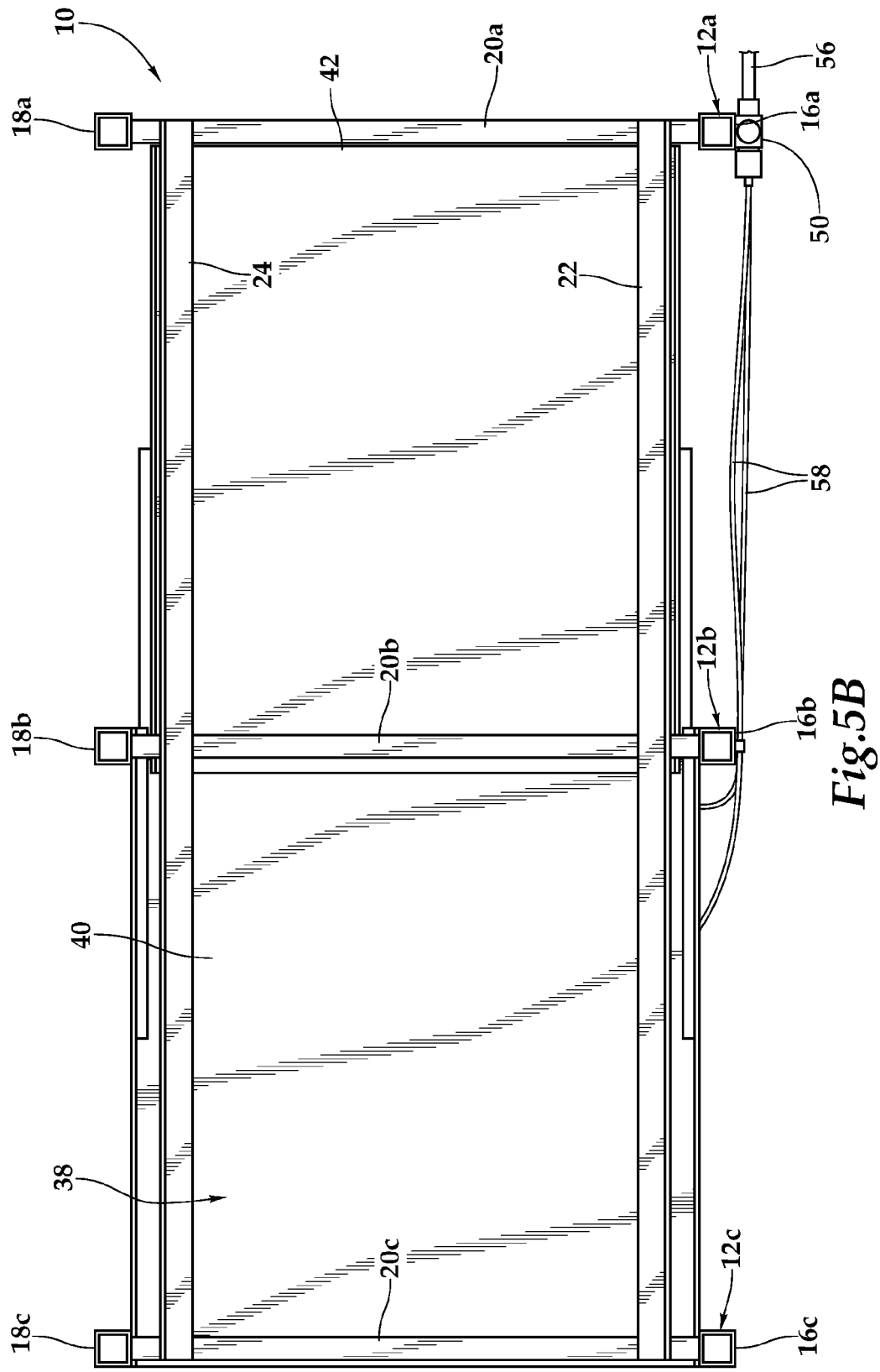

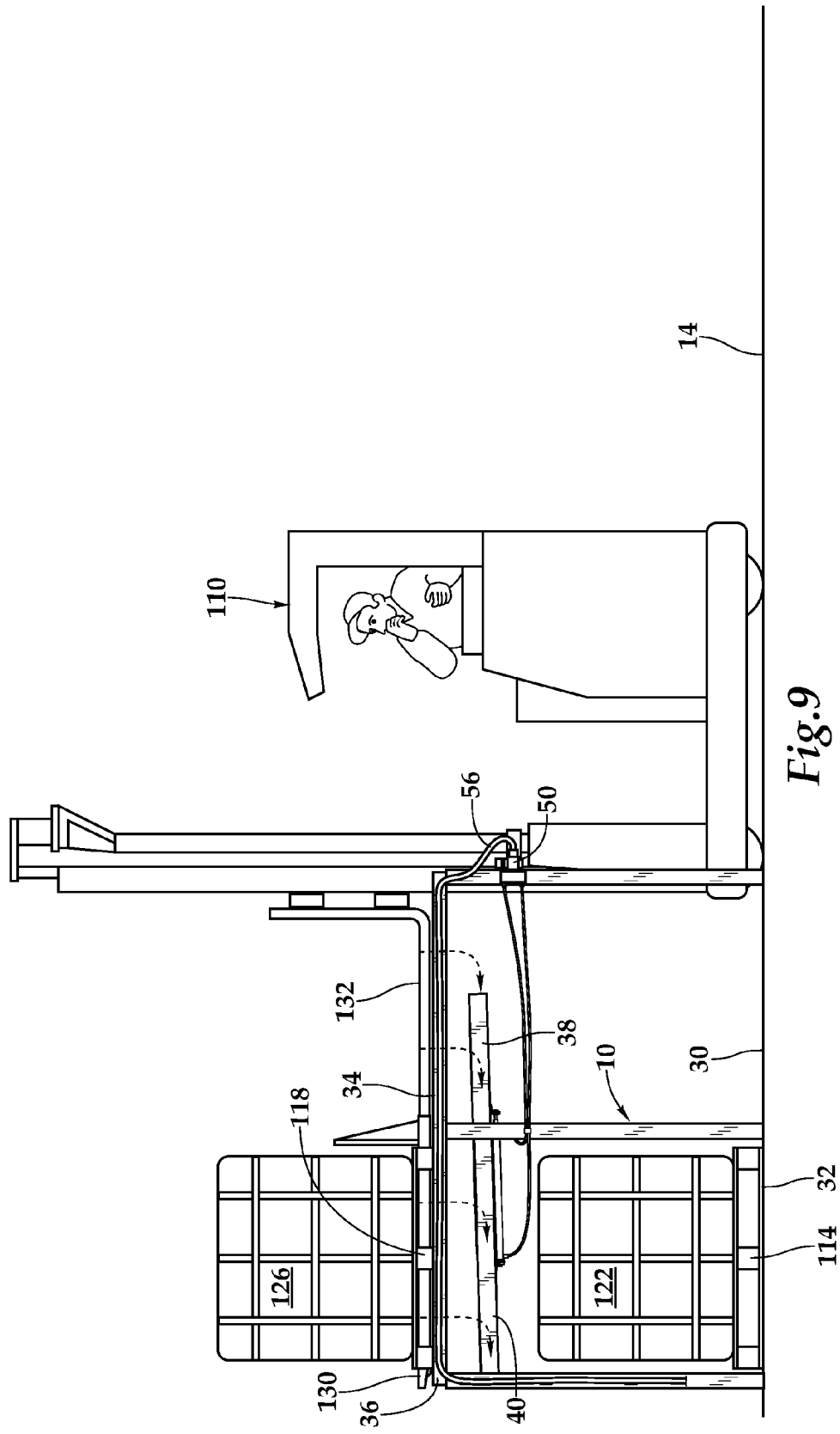

us 8,336,722 B2

PALLET RACK AND METHOD FOR USE OF SAME

PRIORITY STATEMENT & CROSS-REFERENCE TO RELATED APPLICATIONS

This application claims priority from co-pending U.S. Patent Application No. 61/218,344, entitled "Pallet Rack and Method for Use of Same" and filed on Jun. 18, 2009, in the names of Steven A. Cardwell and James C. Rutledge; which is hereby incorporated by reference for all purposes.

TECHNICAL FIELD OF THE INVENTION

This invention relates, in general, to pallet racks and, in particular, to pallet racks for storing fresh produce under sanitary conditions and maintaining the same, particularly with respect to cross-contamination.

BACKGROUND OF THE INVENTION

Pallets literally form the base on which most fresh produce is delivered to the consumer. Over the years, the 40-inch wide, by 48-inch long pallet has evolved as the unofficial standard size. Depending on the size of the produce package, each pallet includes from 20 to 100 individual boxes or bins of produce. Pallets with stacked boxes or bins of produce are stored within produce pallet racks, which typically accommodate multiple adjacent bays of pallets with each bay being two pallets deep and two or more pallets high. The typical pallet rack includes a number of uprights forming a frame having crossbars for additional support. The space between the uprights define the bays and horizontal beams define multiple levels for pallet placement. Forklifts are used to store and retrieve the pallets.

If bacteria are allowed to breed, either on the produce or in an area where the produce will be stored, the risk of foodborne illness occurring greatly increases. When the bacteria are transferred from one source to another, cross-contamination occurs and the risk of foodborne illness is further increased. With fresh produce, such as fruits and vegetables being stored in stacked containers in warehouses, cross-contamination is of particular concern. In the previously described stacked storage situations, cross-contamination can easily happen if water or other debris from produce drips onto produce of the same or different type stored below.

SUMMARY OF THE INVENTION

A pallet rack and method for use of the same are disclosed that provide physical storage designed to prevent food from becoming adulterated while not unduly interfering with normal logistical operations. Cross-contamination of produce can be minimized, in part, by giving proper attention to physical design in storage operations. In one embodiment, three panel frames interconnected by two parallel cross members define two lower pallet receiving areas and two upper pallet receiving areas. A catch tray is disposed beneath the two upper pallet receiving areas to catch and redirect fluid and debris to prevent cross-contamination between pallets. The catch tray includes a primary tray and a slidable dependent tray extendably coupled to the primary tray. The slidable dependent tray extends from a retracted position within the primary tray to an extended position having a general decline from the first panel frame to the second panel frame to furnish a slanted surface therebetween. Retraction of the dependent tray provides clearance for fork lift tines to access the rear upper pallet receiving area.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a front perspective view of one embodiment of the pallet rack;

FIG. 2A is a partial side elevation view of the pallet rack of FIG. 1 wherein one embodiment of a catch tray is disposed in an extended position;

FIG. 2B is a partial side elevation view of the pallet rack of FIG. 2A wherein the catch tray is disposed in a retracted position;

FIG. 3 is a partial front elevation view of the pallet rack of FIG. 1;

FIG. 4 is a partial rear elevation view of the pallet rack of FIG. 1;

FIG. 5A is a top plan view of the pallet rack of FIG. 1 wherein the catch tray is disposed in an extended position;

FIG. 5B is a top plan view of the pallet rack of FIG. 1 wherein the catch tray is disposed in a retracted position;

FIG. 7 is a partial side cross-sectional elevation view of the pallet rack of FIG. 2A wherein the catch tray is catching debris;

FIG. 9 is a schematic illustration of the pallet rack of FIG. 8 wherein the forklift is removing pallets.

DETAILED DESCRIPTION OF THE INVENTION

Figure 6A:
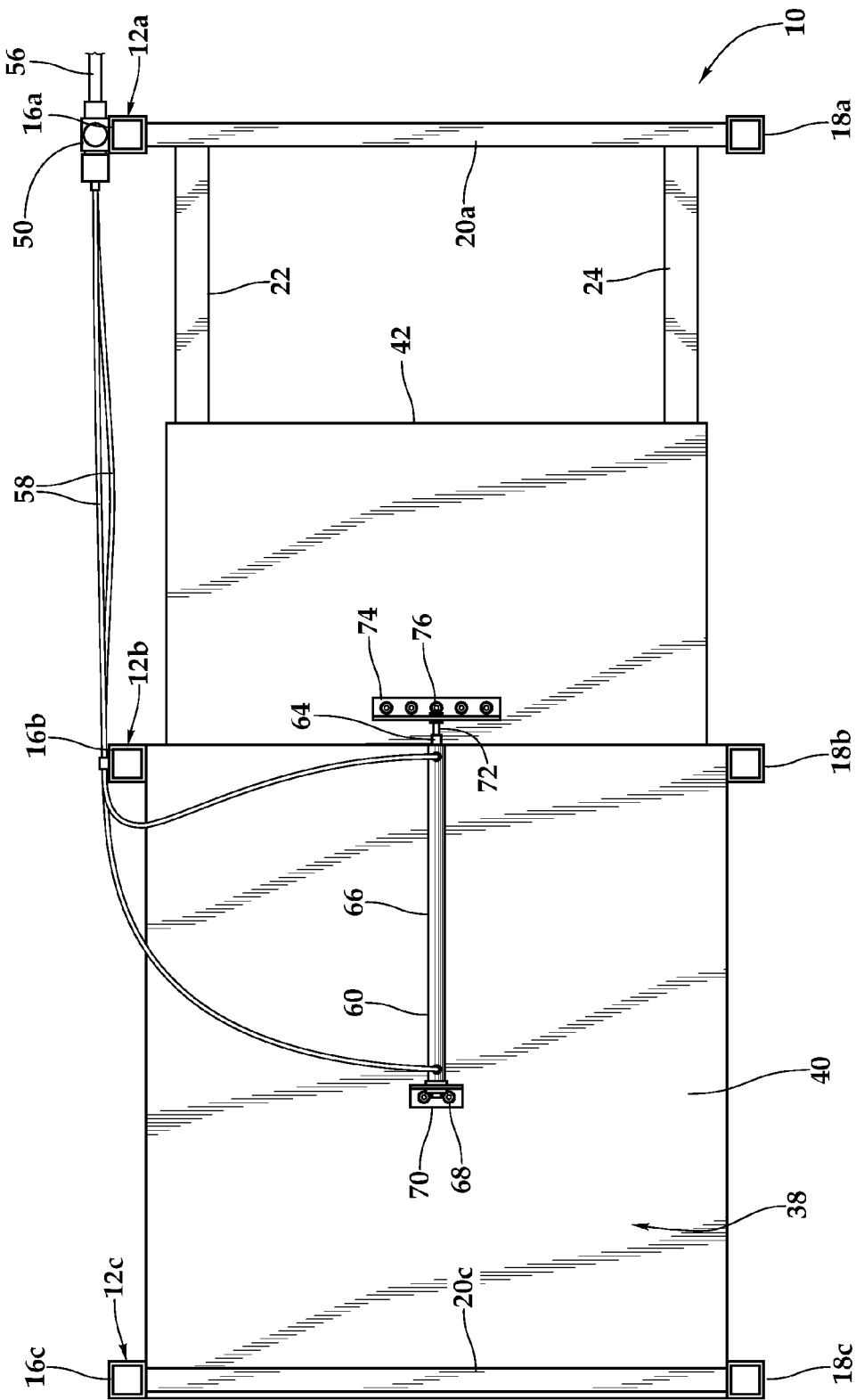
FIG. 6A is a bottom plan view of the pallet rack of FIG. 1 wherein the catch tray is disposed in an extended position.
Figure 6B:
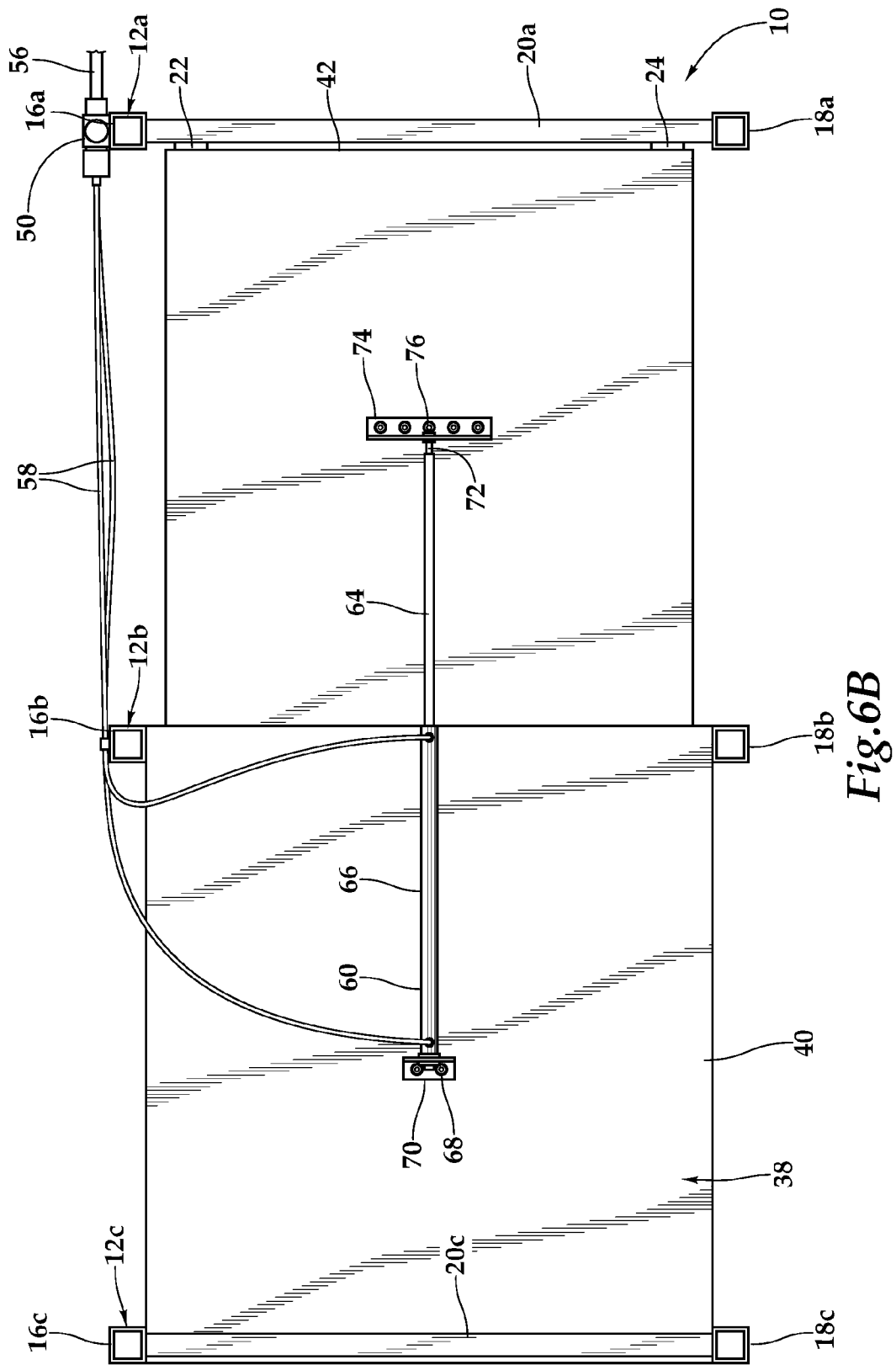
FIG. 6B is a bottom plan view of the pallet rack of FIG. 1 wherein the catch tray is disposed in a retracted position.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Referring initially to FIGS. 1 through 6B, therein is depicted one embodiment of a pallet rack 10, that may be utilized in a warehouse environment to store pallets holding stacked boxes or bins of produce. In such a warehouse environment, multiple pallet racks 10 may be adjacently positioned to further increase storage capacity. Each pallet rack 10 includes panel frames 12A, 12B, 12C that are spaced substantially in parallel alignment and disposed in load-bearing engagement with a floor 14. The panel frame 12A includes a pair of laterally spaced vertically extending uprights 16A, 18A having a crossbeam 20A extending therebetween. The crossbeam 20A has opposite ends connected respectively to the pair of uprights 16A, 18A. Similarly, the panel frame 12B includes uprights 16B, 18B, and crossbeam 20B; and the panel frame 12C includes uprights 16C, 18C, and crossbeam 20C.

Cross members 22, 24 are spaced substantially parallel and extend horizontally to rigidly connect the panel frames 12A, 12B, and 12C. In one embodiment, cross members comprise an L-shape and the opposing L-shaped cross members 22, 24 form channels defined by L-shaped shoulder-flange edges 26, 28 for accepting and supporting the pallet. A lower pallet receiving area 30 is dimensioned to accommodate a pallet and formed by panel frames 12A, 12B. Similarly, a second lower receiving area 32 is likewise dimensioned to accommodate a pallet and formed by the second and third panel frames 12B, 12C. In one implementation, the lower pallet receiving areas 30, 32 are each sized to contain a 40-inch wide, by 48-inch long pallet.

Upper pallet receiving areas 34, 36 are also dimensioned to accommodate pallets with the upper pallet receiving area 30 being superposed above or over the lower receiving area 26 and the upper pallet receiving area 36 being superposed over the lower receiving area 30. In one implementation, the upper pallet receiving areas 34, 36 are each sized to contain a 40-inch wide, by 48-inch long pallet. As previously alluded, the L-shaped edges 26, 28 provide lateral support and deck support for maintaining the pallets in position.

A catch tray 38 includes a primary tray 40 coupled to the panel frames 12B, 12C and a slidable dependent tray 42 extendably coupled to the primary tray 40. The primary tray 40 has a general decline from the panel frame 12B to the panel frame 12C to furnish a slanted surface therebetween. The slidable dependent tray 42 extends from a retracted position within the primary tray 40 to an extended position beneath the upper pallet receiving area 34 to provide a general decline from the panel frame 12A to the panel frame 12B and furnish a slanted surface therebetween. When extended, the dependent tray and primary tray provide a substantially continuous slanted surface 44 from the panel frame 12A to the panel frame 12B to the panel frame 12C. The slope of the slanted surface 44 may be between about 0.01 inches/linear foot and about 0.02 inches/linear foot. In one implementation a ¾ inch fall is provided over 4 feet. It should be appreciated that various construction techniques including the use of braces, brackets, fasteners, and welds may be utilized in the illustrated construction of the pallet rack 10.

An actuator 50 selectively controls the slidable dependent tray 42 between the retracted and extended positions. In particular, a cylinder and air valve arrangement 52 selectively actuate the slidable dependent tray 42 between the retracted and extended positions. In this arrangement, a dual action air valve switch 54 may be mounted to the panel frame 12A and connected with suitable tubing 56, 58 between a supply of compressed air and a sliding cylinder 60. Actuation of the dual action air valve switch 54 reciprocates the dependent tray 42 between the retracted and extended positions. The dual action air valve switch 54 may have a regulator 62 therein to provide a workable low-pressure air stream from which equipment can safely operate by mitigating the risk of excessive force during retracting and expanding operations. The sliding cylinder 60 is mounted to the undercarriage of the primary tray 40 and dependent tray 42. A closed head or piston 64 is moved reciprocally in a slightly larger cylindrical chamber 66, which is mounted to the primary tray 40, by or against pressure of a fluid such as that provided by air and the actuator 50. As shown, a base member 68, with, as shown two screws 70, secures the cylindrical chamber 66 to the primary tray 40. The reciprocating movement of the piston 64 reciprocally moves, in unison, an arm 70 which is mounted by a coupling member 74 and five screws 78 to the dependent tray 42, thereby causing the extending and retracting of the dependent tray 42 from a retracted position within the primary tray 40 to an extended position beneath the first upper pallet receiving area 34.

It should be appreciated that other driving mechanisms may be utilized for extending and retracting the dependent tray from the primary tray. By way of another embodiment, fluid may be utilized instead of compressed air. By way of another example a motor, such as a step motor, may be employed to extend and retract the dependent tray along a track, for example. In one embodiment, a vertical transference pan (shown as number 78 in FIG. 7) is positioned proximate to the panel frame 12C and coupled to the edge of the primary tray 40 of the catch tray to provide for controlled fluid and debris migration vertically from the primary tray 40 to location proximate or at the floor 14. In one particular embodiment, the vertical transference pan 78 controls the movement of the fluid and debris to a drain 80 located in the floor 14.

Moreover, it should be appreciated that other devices may be incorporated into the pallet rack. In one embodiment, a warning strip 82 (see FIG. 1) is located on the slidable dependent tray 42 at an end proximate to the panel frame 12A. The warning strip provides a clear indication to an individual, such as a forklift operator or other warehouse worker, of the location of the dependent tray 42. In another embodiment, a contact strip is located on the slidable dependent tray 42 at an end proximate to the panel frame 12A. The contact strip for actuating an indicator in response to mechanical contact therewith. The indicator may, depending on the embodiment, be a visual indicator, such as a light that lights upon contact or an alarm that sounds in response to contact. Audiovisual combinations of lights and alarms may also be used.

Referring to FIGS. 6A through 7, in one embodiment, as discussed, the primary tray 40 is mounted to the panel frames 12B, 12C by mounting brackets. The dependent tray may be coupled to the primary tray by a mounting assembly that includes slots and rivets for securing the primary tray to the panel frames 12B, 12C. Ribs are disposed at opposing sides of the primary tray and orthogonally to backstops. The ribs each further comprise a pair of axle pins that span the ribs. The axle pins may be held in place by cotter pins or pressed acorn caps, for example. Runner plates are coupled to the dependent tray and slidably mounted to the ribs such that the dependent tray slides with the movement of the runner plates. Each of the runner plates include respective slots that receive the respective axle pins such that the first and second runner plates travel thereon orthogonally to the respective pairs of axle pins. The movement of dependent tray is further limited by the aforementioned backstops as the dependent tray contacts the backstops upon being fully retracted. This arrangement is shown in FIGS. 6A through 7 with mounting assembly 92, rib 94, backstop 96, axle pins 98, runner plate 100, and slot 102.

As an alternative linear sliding mechanism, a screw-driven slide having connection to a power source may be furnished that includes a precision aluminum guide and carriage and is driven by a precision rolled lead screw. The moving surfaces of this type arrangement may include various polymers and polymer coatings. In operation, the catch tray 38 captures fluids and debris released from the palletized contents and redirects the captured fluid and debris (arrows 104, 106) down the slanted surface to a more visible location near the panel frame 12C of the pallet rack. The fluid and debris (arrows 104, 106) may rest on the primary tray 40 and become visible to an inspector or individual. Cross-contamination from an upper pallet of produce to a lower pallet of produce is therefore avoided. Alternatively, vertical transference tray 78 may provide a pathway for the fluid and debris (arrow 106) to flow toward the floor 14 in a controlled manner.

Figure 8:
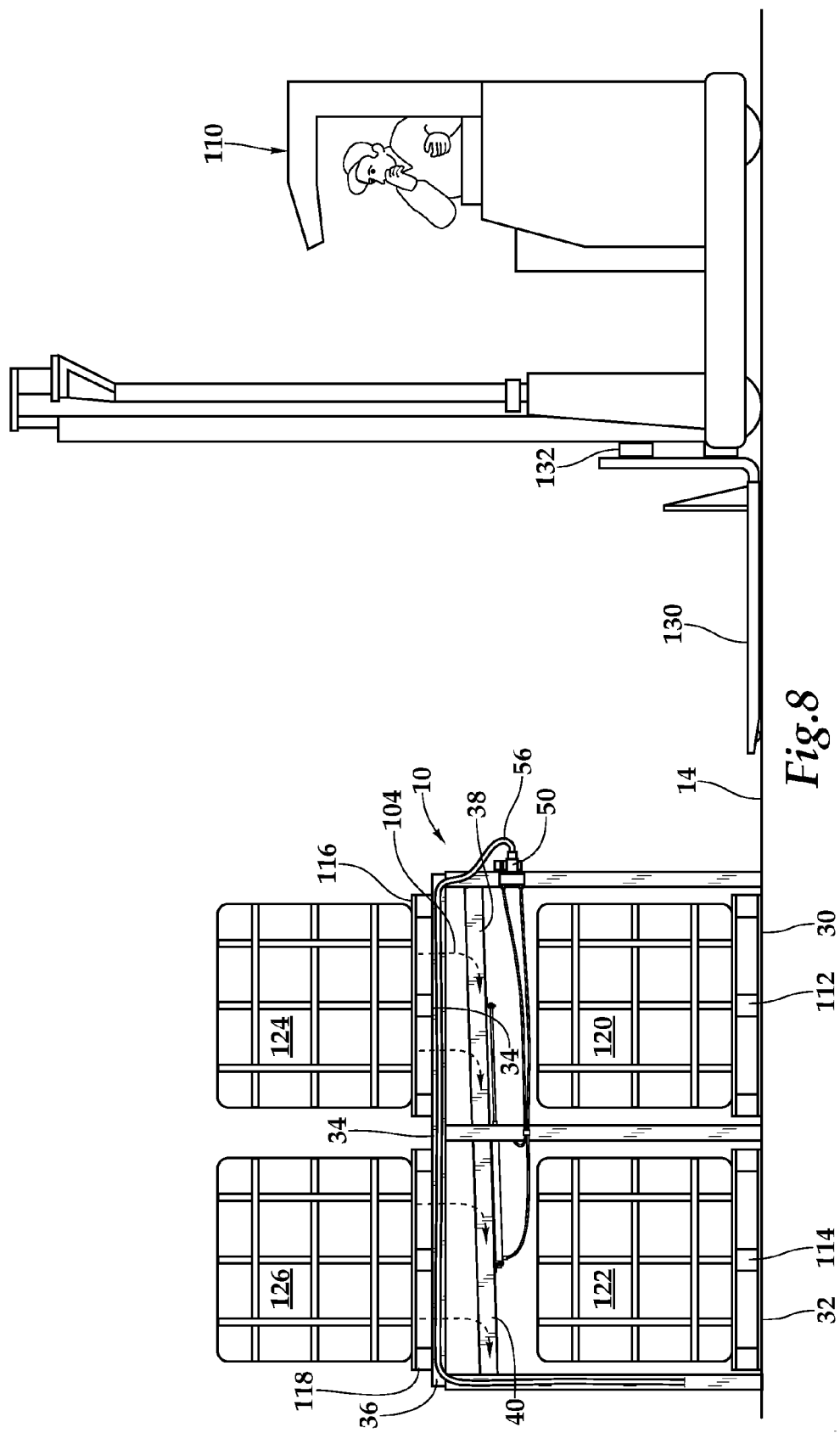
FIG. 8 is a schematic illustration of the pallet rack of FIG. 1 wherein a forklift is preparing to remove a pallet.

FIG. 8 depicts a forklift 110 preparing to remove a pallet from the pallet rack 10, which is shown in a double-deep configuration whereby pallets may be stacked two-deep and handled from the same side of an aisle to increase storage capacity without increasing storage space. In operation, as discussed, four pallets 112, 114, 116, 118 with respectively stacked boxes or bins of produce 120, 122, 124, 126, for example, are stored within the pallet rack 10 in the four respective receiving areas 30, 32, 34, 36 such that two pallets 112, 116 are positioned on the floor 14 and two pallets are positioned off the floor 14, being supported by the pallet rack 10. During storage, the dependent tray 42 is fully extended to capture fluids and debris, as shown by arrows 104, received from an upper rear pallet 114, 118 of produce. With this configuration, the catch tray 38 captures fluids and debris released from the palletized contents, whether fluid and debris from the upper pallet 114 positioned in the upper pallet receiving area 34 or fluid and debris from the upper pallet 118 positioned in the upper pallet receiving area 36, and redirects the captured fluid and debris down the slanted surface 44 of the catch tray 38 to a more visible location on the pallet rack 10. Fluid and debris from the upper pallet 114 contacts the dependent tray 42 and then migrates down the slanted surface 44 to the primary tray 40. On the other hand, fluid and debris from the upper pallet 118 contacts the primary tray 40 initially. The fluid and debris may rest at an end of the primary tray 40 of the catch tray 38 and become visible to an inspector or individual. Cross-contamination from an upper pallet of produce to a lower pallet of produce is therefore avoided.

In the extended position, the dependent tray 42 projects from a point where there is sufficient space for the accommodation of forklift tines 120 to a position where forklift tines 120 contact the extended dependent tray and prevent the forklift tines 130 from efficiently engaging a rear positioned pallet of produce at receiving area 36. The arrangement of the primary and dependent trays 40, 42 enables the prevention of cross-contamination while providing the space necessary for the accommodation of forklift tines and the removal of pallets. In the retracted position, the dependent tray 42 is removed from a position where puncturing, buckling, and torsional twisting may occur upon inadvertent or unintentional contact with the forklift tines.

FIG. 9 depicts the forklift 110 removing pallets from the pallet rack 10. The forklift 40 may remove the upper pallet 114 from the pallet receiving area 34 and the lower pallet 112 from the lower pallet receiving area 30 in a conventional manner by the tines 130 of the forklift 110 appropriately engaging the pallets 112, 114. As mentioned, during storage, the dependent tray 42 is fully extended to capture fluids and debris received from the upper pallet 114 of produce or other goods. When an operator desires to remove a pallet, such as the second upper pallet of produce, the slidable dependent tray 42 is retracted, as shown, through actuation of the aforementioned actuator 50 to provide sufficient clearance, including both vertical and horizontal mobility for the fork lift and fork lift tines, for the forklift tines 130 to engage the upper rear pallet 118. As depicted, a pantograph apparatus 132 or other horizontal tine-like projections suspended from the carriage, for example, enable the hyper-extension and retraction of the forklift tines 130. That is, upon retraction of the dependent tray 42 into the primary tray 40 to create more space horizontally and vertically, sufficient space is provided between the pallet frame 12A and each of the upper second pallet 118 and the primary tray 40 to allow for the forklift tines 130 to engage the upper second pallet 118. With the clearance created by the retraction of the dependent tray 42, forklift tine access to the pallets, including to the lower pallet receiving area 32 and the upper pallet receiving area 36, is achieved for removal of pallets located in these receiving areas. It should be appreciated that pallets may be stored in the pallet rack by operating the catch tray in the opposite manner, i.e., initially positioning the dependent tray 42 in a retracted position for loading the pallets in the rear lower and upper pallet receiving areas 34, 36 and then positioning the dependent tray 42 in the extended position to redirect and fluid and debris.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A pallet rack for storing fresh produce under sanitary conditions, the pallet rack comprising:
   first, second, and third panel frames being spaced substantially in parallel alignment and disposed in load-bearing engagement with a floor, the first, second, and third panel frames each including a pair of laterally spaced vertically extending uprights having a crossbeam extending therebetween, the crossbeam having opposite ends connected respectively to the pair of uprights;
   first and second cross members being spaced substantially parallel and extending horizontally to rigidly connect the first, second, and third panel frames;
   a first lower receiving area dimensioned to accommodate a pallet, the first lower receiving area being formed by the first and second panel frames;
   a second lower receiving area dimensioned to accommodate a pallet, the second lower receiving area being formed by the second and third panel frames;
   a first upper receiving area dimensioned to accommodate a pallet, the first upper receiving are being superposed on the first lower receiving area;
   a second upper receiving area dimensioned to accommodate a pallet, the second upper receiving are being superposed on the first lower receiving area;
   a primary tray coupled to the second and third panel frames, the primary tray having a general decline from the second panel frame to the third panel frame to furnish a slanted surface therebetween;
   a slidable dependent tray extendably coupled to the primary tray, the slidable dependent tray extending from a retracted position within the primary tray to an extended position having a general decline from the first panel frame to the second panel frame to furnish a slanted surface therebetween; and
   an actuator for selectively controlling the slidable dependent tray between the retracted and extended positions.

2. The pallet rack as recited in claim 1, wherein the first and second cross members comprise L-shaped cross members, a channel for accepting a pallet formed therebetween.

3. The pallet rack as recited in claim 1, further comprising a warning strip located on the slidable dependent tray at an end proximate to the first panel frame.

4. The pallet rack as recited in claim 1, further comprising a contact strip located on the slidable dependent tray at an end proximate to the first panel frame, the contact strip, the contact strip for actuating an indicator in response to mechanical contact therewith.

5. The pallet rack as recited in claim 1, further comprising a vertical tray coupled to the third panel frame, the vertical tray disposed in fluid communication with the primary tray to provide for fluid flow from the primary tray to the floor.

6. The pallet rack as recited in claim 1, wherein the slidable dependent tray in the retracted position provides fork-lift tine access to the second upper receiving area.

7. The pallet rack as recited in claim 1, wherein the actuator further comprises a cylinder and air valve arrangement.

8. A pallet rack for storing fresh produce under sanitary conditions, the pallet rack comprising:
- first, second, and third panel frames being spaced substantially in parallel alignment and disposed in load-bearing engagement with a floor, the first, second, and third panel frames each including a pair of laterally spaced vertically extending uprights having a crossbeam extending therebetween, the crossbeam having opposite ends connected respectively to the pair of uprights;
- first and second cross members being spaced substantially parallel and extending horizontally to rigidly connect the first, second, and third panel frames;
- a first lower receiving area dimensioned to accommodate a pallet, the first lower receiving area being formed by the first and second panel frames;
- a second lower receiving area dimensioned to accommodate a pallet, the second lower receiving area being formed by the second and third panel frames;
- a first upper receiving area dimensioned to accommodate a pallet, the first upper receiving are being superposed on the first lower receiving area;
- a second upper receiving area dimensioned to accommodate a pallet, the second upper receiving are being superposed on the first lower receiving area;
- a primary tray coupled to the second and third panel frames, the primary tray having a general decline from the second panel frame to the third panel frame to furnish a slanted surface therebetween;
- a slidable dependent tray extendably coupled to the primary tray, the slidable dependent tray extending from a retracted position within the primary tray to an extended position having a general decline from the first panel frame to the second panel frame to furnish a slanted surface therebetween,
- wherein the slidable dependent tray in the retracted position provides fork-lift tine access to the second upper receiving area; and
- a cylinder and air valve arrangement for selectively controlling the slidable dependent tray between the retracted and extended positions.

9. A method for storing fresh produce under sanitary conditions, the method comprising:
- providing a pallet rack, the pallet rack including first, second, and third panel frames spaced substantially in parallel alignment and disposed in load-bearing engagement with a floor, the first, second, and third panel frames each including a pair of laterally spaced vertically extending uprights having a crossbeam extending therebetween, the crossbeam having opposite ends connected respectively to the pair of uprights, first and second cross members being spaced substantially parallel and extending horizontally to rigidly connect the first, second, and third panel frames;
- locating a first pallet in a first lower receiving area dimensioned to accommodate the first pallet, the first lower receiving area being formed by the first and second panel frames;
- locating a second pallet in a second lower receiving area dimensioned to accommodate the second pallet, the second lower receiving area being formed by the second and third panel frames;
- locating a third pallet in a first upper receiving area dimensioned to accommodate the third pallet, the first upper receiving are being superposed on the first lower receiving area;
- locating a fourth pallet in a second upper receiving area dimensioned to accommodate the fourth pallet, the second upper receiving are being superposed on the first lower receiving area;
- catching debris from the fourth pallet in a primary tray coupled to the second and third panel frames, the primary tray having a general decline from the second panel frame to the third panel frame to furnish a slanted surface therebetween;
- catching debris from the third pallet in a slidable dependent tray extendably coupled to the primary tray, the slidable dependent tray being extended from a retracted position within the primary tray to an extended position having a general decline from the first panel frame to the second panel frame to furnish a slanted surface therebetween; and
- retracting the dependent tray from the extended position to a retracted position to provide fork lift tine access to the second upper receiving area.

10. The method as recited in claim 9, wherein catching debris from the third pallet in a slidable dependent tray extendably coupled to the primary tray further comprises redirecting the debris down the slidable dependent tray to the primary tray.

11. The method as recited in claim 9, wherein the debris further comprises water.

12. The method as recited in claim 9, wherein the cooperation of the primary tray and dependent tray prevents cross-contamination.

* * * * *